(12) United States Patent
Hong et al.

(10) Patent No.: US 11,809,221 B2
(45) Date of Patent: Nov. 7, 2023

(54) ARTIFICIAL INTELLIGENCE CHIP AND DATA OPERATION METHOD

(71) Applicant: Shanghai Biren Technology Co., Ltd, Shanghai (CN)

(72) Inventors: Zhou Hong, Shanghai (CN); Qin Zheng, Shanghai (CN); ChengPing Luo, Shanghai (CN); GuoFang Jiao, Shanghai (CN); Song Zhao, Shanghai (CN); XiangLiang Yu, Shanghai (CN)

(73) Assignee: Shanghai Biren Technology Co., Ltd, Shanghai (CN)

( * ) Notice: Subject to any disclaimer, the term of this patent is extended or adjusted under 35 U.S.C. 154(b) by 303 days.

(21) Appl. No.: 17/468,682

(22) Filed: Sep. 8, 2021

(65) Prior Publication Data
US 2022/0398102 A1 Dec. 15, 2022

(30) Foreign Application Priority Data
Jun. 11, 2021 (CN) .......................... 202110653770.6

(51) Int. Cl.
*G06F 12/06* (2006.01)
*G06F 12/02* (2006.01)
*G06F 13/12* (2006.01)

(52) U.S. Cl.
CPC ...... *G06F 12/0615* (2013.01); *G06F 12/0284* (2013.01); *G06F 12/0646* (2013.01); *G06F 13/124* (2013.01); *G06F 2213/0026* (2013.01)

(58) Field of Classification Search
CPC .......... G06F 12/10; G06F 12/02; G06F 12/08; G06F 13/124; G06F 12/0615;
(Continued)

(56) References Cited

U.S. PATENT DOCUMENTS

| 6,519,690 B1 | 2/2003 | Quimby |
| 2007/0019637 A1 | 1/2007 | Boyd et al. |

(Continued)

OTHER PUBLICATIONS

Wikipedia, "AI accelerator", retrieved on Oct. 1, 2020, pp. 1-12. Available at: https://en.wikipedia.org/w/index.php?title=AI_accelerator &oldid=896222309.

(Continued)

*Primary Examiner* — Pierre Michel Bataille
(74) *Attorney, Agent, or Firm* — JCIP GLOBAL INC.

(57) ABSTRACT

An artificial intelligence chip and a data operation method are provided. The artificial intelligence chip receives a command carrying first data and address information and includes a chip memory, a computing processor, a base address register, and an extended address processor. The base address register is configured to access an extended address space in the chip memory. The extended address processor receives the command. The extended address processor determines an operation mode of the first data according to the address information. When the address information points to a first section of the extended address space, the extended address processor performs a first operation on the first data. When the address information points to a section other than the first section of the extended address space, the extended address processor notifies the computing processor of the operation mode and the computing processor performs a second operation on the first data.

14 Claims, 5 Drawing Sheets

(58) Field of Classification Search
CPC ............. G06F 12/0646; G06F 12/0284; G06F 13/128; G06F 13/28; G06F 13/12; G06F 12/0888; G06F 12/1072; G06F 12/0813; G06F 12/0292; G06F 12/0246; G06F 2212/2542; G06F 2212/1024; G06F 2213/0026; G06N 20/00; H04L 67/1097; H04L 69/22
See application file for complete search history.

(56) References Cited

U.S. PATENT DOCUMENTS

2008/0147887 A1    6/2008    Freimuth et al.
2009/0248941 A1    10/2009   Morein et al.

OTHER PUBLICATIONS

"Search Report of Europe Counterpart Application", dated Jun. 21, 2022, p. 1-p. 13.

ARTIFICIAL INTELLIGENCE CHIP AND DATA OPERATION METHOD

CROSS-REFERENCE TO RELATED APPLICATION

This application claims the priority benefit of China application serial no. 202110653770.6, filed on Jun. 11, 2021. The entirety of the above-mentioned patent application is hereby incorporated by reference herein and made a part of this specification.

BACKGROUND

Technical Field

The disclosure relates to the field of multi-chip cluster parallel computing, and in particular, to an artificial intelligence chip and a data operation method.

Description of Related Art

At present, in the field of multi-chip cluster parallel computing, the collective communication solutions are commonly used in the industry to realize data sharing and data transmission operations among multiple nodes. In collective communication, the process of "chip A of node 1 sending data to chip B of node 2" currently may be divided into four steps. Step 1: The chip A on the node 1 sends data to the system memory of the node 1. Step 2: The chip A on the node 1 sends a network request to the network interface controller (NIC) on the node 1, and the NIC on the node 1 reads the "data copied from chip A to system memory in step 1" from the system memory of the node 1 and sends this data to the NIC of the node 2. Step S3: The NIC of the node 2 receives the data of the NIC of the node 1 and stores this data in the system memory of the node 2. Step 4: The chip B of the node 2 reads the "data from chip A of node 1" from the system memory of the node 2. Regarding the above steps, how to simplify these steps and further optimize the performance of collective communication is an important technical issue in this field.

SUMMARY

The disclosure provides an artificial intelligence chip and an operation mode thereof capable of efficiently performing collective communication.

The disclosure provides an artificial intelligence chip suitable for receiving a command carrying first data and address information. In an embodiment of the disclosure, the artificial intelligence chip includes a chip memory, a computing processor, a base address register, and an extended address processor. The computing processor is coupled to the chip memory. The base address register is configured to access an extended address space of the chip memory. The extended address space is greater than a physical memory address space of the chip memory. The extended address processor is coupled to the computing processor and the base address register. The extended address processor receives the command. The extended address processor determines an operation mode of the first data according to the address information pointing to one among a plurality of sections included in the extended address space. When the address information points to a first section of the extended address space, the extended address processor performs a first operation on the first data. When the address information points to a section other than the first section of the extended address space, the extended address processor notifies the computing processor of the operation mode and the computing processor performs a second operation on the first data. The first section corresponds to the physical memory address space.

The disclosure further provides a data operation method configured for an artificial intelligence chip. In an embodiment of the disclosure, the artificial intelligence chip includes a chip memory, a base address register, an extended address processor, and a computing processor. The data operation method includes the following steps. An extended address space for accessing the chip memory is allocated to the base address register. The extended address space is greater than a physical memory address space of the chip memory. The extended address processor receives a command carrying first data and address information. The extended address processor determines an operation mode of the first data according to the address information pointing to one among a plurality of sections included in the extended address space. When the address information points to a first section of the extended address space, the extended address processor performs a first operation on the first data. When the address information points to a section other than the first section of the extended address space, the extended address processor notifies the computing processor of the operation mode and the computing processor performs a second operation on the first data. The first section corresponds to the physical memory address space.

To sum up, in the embodiments of the disclosure, the artificial intelligence chip receives the command carrying the first data and the address information and determines the collective communication operation of the first data according to the extended address pointing to one among the sections of the extended address space. Therefore, the artificial intelligence chip may efficiently perform the collective communication operation.

DESCRIPTION OF THE EMBODIMENTS

Figure 1:
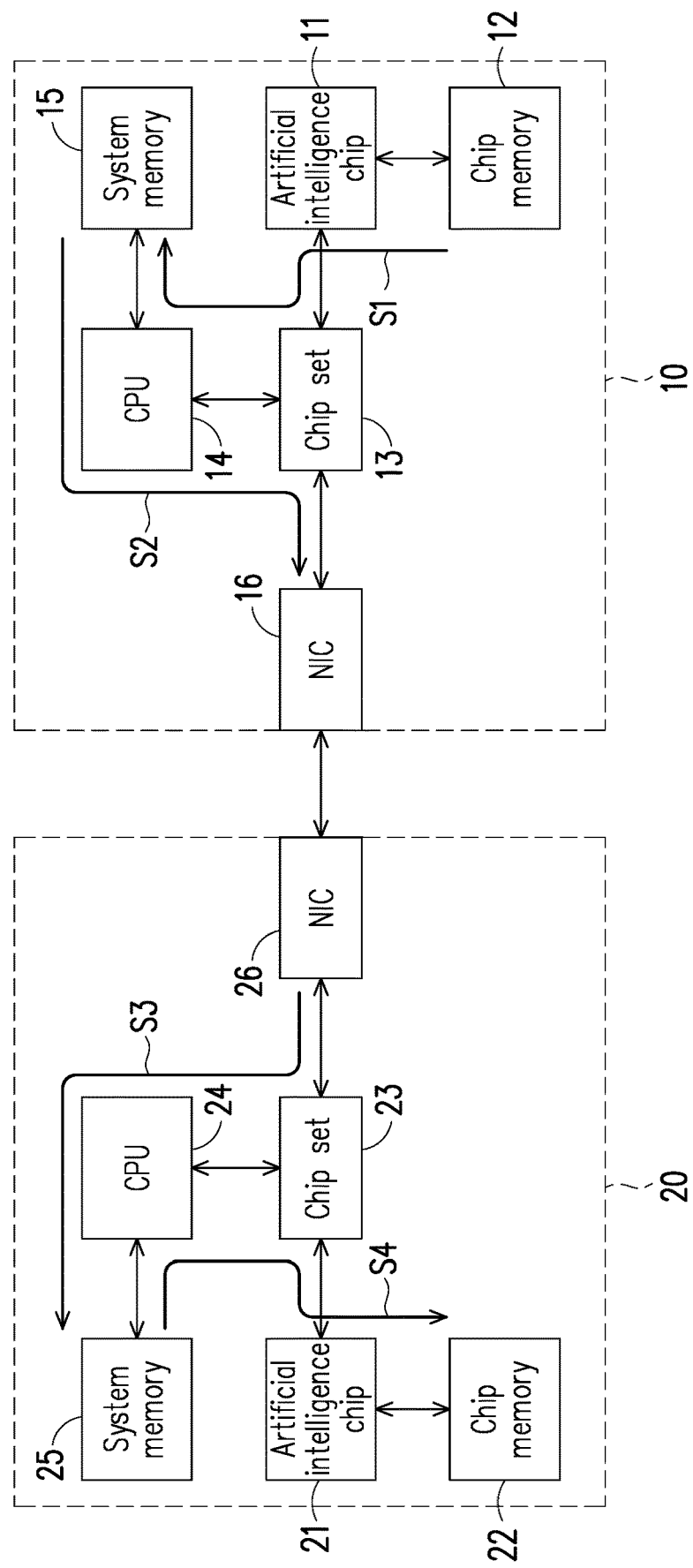
FIG. 1 is a schematic view illustrating a collective communication system according to an embodiment of the disclosure.

Descriptions of the disclosure are given with reference to the exemplary embodiments illustrated by the accompanying drawings. Wherever possible, the same reference numbers are used in the drawings and the description to refer to the same or like parts.

The term "coupled to (or connected to)" used in the entire specification (including claims) refers to any direct or indirect connecting means. For example, if the disclosure describes a first apparatus is coupled to (or connected to) a second apparatus, the description should be explained as the first apparatus is connected directly to the second apparatus, or the first apparatus, through connecting other apparatus or using certain connecting means, is connected indirectly to the second apparatus. In addition, terms such as "first" and "second" in the entire specification (including claims) are used only to name the elements or to distinguish different embodiments or scopes and should not be construed as the upper limit or lower limit of the number of any element and should not be construed to limit the order of the elements. Moreover, elements/components/steps with the same reference numerals represent the same or similar parts in the figures and embodiments where appropriate. Elements/components/steps having same reference numerals or same terms are used as cross reference in different embodiments.

FIG. 1 is a schematic view of a collective communication system according to an embodiment of the disclosure. In this embodiment, the collective communication system shown in FIG. 1 includes nodes 10 and 20. The nodes 10 and 20 may be computers or other computing platforms. In a collective communication solution provided by the related art, a process of sending data to an artificial intelligence chip 21 of the node 20 from an artificial intelligence chip 11 of the node 10 may be divided into four steps. Step S1: The artificial intelligence chip 11 on the node 10 sends data stored in a chip memory 12 to a system memory 15 of the node 10 through a chip set 13 and a central processing unit (CPU) 14. In this embodiment, the artificial intelligence chip 11 may include a graphics processing unit (GPU) and/or a chip exhibiting other data computing functions. The chip memory 12 may include a GPU memory and/or other chip memories. Step S2: The artificial intelligence chip 11 on the node 10 sends a network request to a network interface controller (NIC) 16 on the node 10. The NIC 16 on the node 10 reads the data copied to the system memory 15 in the above step S1 from the system memory 15 of the node 10, and the NIC 16 sends this data to a NIC 26 of the node 20. Step S3: The NIC 26 of the node 20 receives the data of the NIC 16 of the node 10 and stores this data in a system memory 25 of the node 20. Step S4: The artificial intelligence chip 21 of the node 20 reads the data from the artificial intelligence chip 11 of the node 10 from the system memory 25 of the node 20. These four steps essentially experience 1 time of data transmission and 2 times of data copying.

Figure 2:
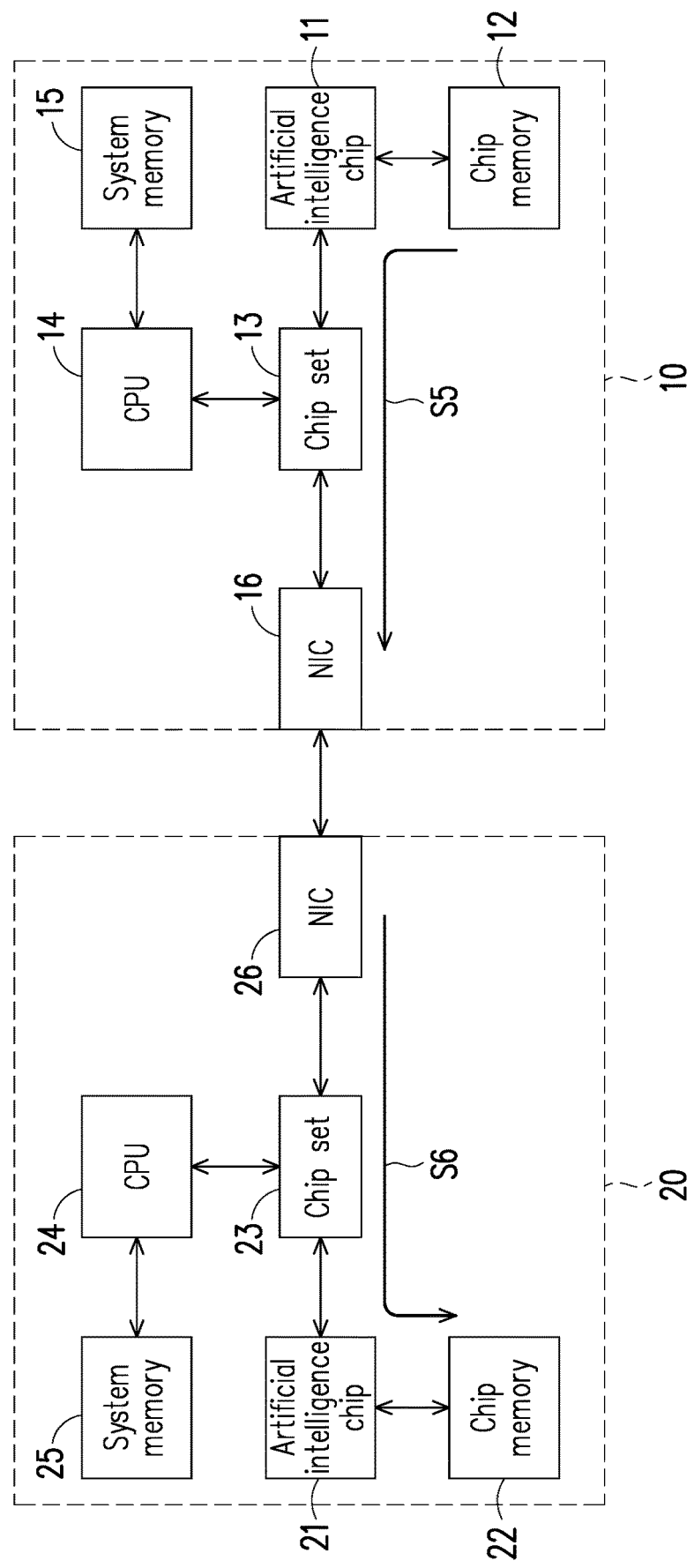
FIG. 2 is a schematic view of another collective communication system according to an embodiment of the disclosure.

FIG. 2 is a schematic view of another collective communication system according to an embodiment of the disclosure. In order to reduce the transmission delay of collective communication, the remote direct memory access (RDMA) technique may be applied to the collective communication system shown in FIG. 2. When data transmission is required, the NIC directly accesses the artificial intelligence chip (e.g., GPU) to shorten the data communication delay between the chips of different nodes, and performance may thus be improved in this way. To be specific, based on the collective communication system architecture shown in FIG. 2, the RDMA technique may be divided into two steps. Step S5: The artificial intelligence chip (e.g., GPU) 11 on the node 10 sends a data transmission request to the NIC 16. The NIC 16 of the node 10 reads the data required to be transmitted by the artificial intelligence chip 11 from the chip memory 12 according to the data transmission request and sends the data to the NIC 26 of the node 20. Step S6: The NIC 26 of the node 20 receives the data of the NIC 16 of the node 10 and writes the data directly into a chip memory 22 of the artificial intelligence chip 21 of the node 20. It thus can be seen that when the RDMA technique is applied, 2 times of data copying may be omitted, and the steps required for data transmission may be decreased to 2 steps.

The above paragraph describes the data transmission merely between 2 artificial intelligence chips (e.g., GPU) 11 and 21. In practical applications, especially in the computation of weight values in artificial intelligence computing, after receiving the data from the NIC 26, the artificial intelligence chip 21 of the node 20 needs to perform a collective communication operation on both the received data and local data before allowing the data to be used. Therefore, the cross-node collective communication based on RDMA technique needs to go through the following three steps. Step S5: The artificial intelligence chip (e.g., GPU) 11 of the node 10 sends a data transmission request (e.g., a read request) to the NIC 16, and the NIC 16 of the node 10 reads the data required to be transmitted by the artificial intelligence chip 11 from the chip memory 12 according to the data transmission request and sends the data to the NIC 26 of the node 20. Step S6: The NIC 26 of the node 20 receives the data of the NIC 16 of the node 10 and writes the data directly into the chip memory 22 of the artificial intelligence chip 21 (e.g., GPU) of the node 20. Step S7 (not shown): The artificial intelligence chip 21 of the node 20 performs collective communication processing on the data from the node 10 and the data stored in the chip memory 22 (according to the type of collective communication, the artificial intelligence chip 21 performs different corresponding processing), and saves result data in the chip memory 22 of the artificial intelligence chip 21.

Herein, after step S6 is completed, synchronization is required to be performed before execution of step S7. In step S7, collective communication processing is required to be performed once again on both the data of reading the node 10 from the chip memory 22 and the local data. There is an additional operation in step S6 and step S7, that is, the data of the node 10 is written into the chip memory 22 and then is read from the chip memory 22, so as to go through collective communication processing with the local data. This additional operation brings the following overheads: 1. The time of the entire process is increased (synchronization is required after step S6 is completed, which greatly increases the delay); 2. A write operation is performed once on the chip memory 22 of the node 20 in step S6 (the data of node 10 is written into the chip memory 22). In step S7, it is necessary to perform a read operation (read the data of the node 10 from the chip memory 22) and a write operation (write the result data of the collective communication processing into the chip memory 22) on the chip memory 22 again. Therefore, the burden of reading and writing of the chip memory 22 may grow, and increased memory reading and writing operation bandwidth may be occupied. In thus can be seen that regarding the collective communication processing performed on both the data of reading the node 10 from the chip memory 22 and the local data, the cross-node RDMA technique still needs to be improved.

In this embodiment, a data operation technique based on address extension is provided. In such a data operation technique, the three steps required in the foregoing embodiments (that is, the application of the RDMA technique to the cross-node collective communication operation) may be decreased to two steps, namely the following step A and step B. Step A: The artificial intelligence chip 11 of the node 10 sends a data transmission request (e.g., a read request) to the NIC 16. The NIC 16 of the node 10 reads the data required to be transmitted by the artificial intelligence chip 11 from the chip memory 12 according to the data transmission request and sends the data required to be transmitted to the NIC 26 of the node 20. Step B: the artificial intelligence chip 21 of the node 20 receives first data from the artificial intelligence chip 11 of the node 10 through the NIC 26 and writes the data from the artificial intelligence chip 11 of the node 10 to the chip memory 22 of the node 20. The artificial intelligence chip 21 may also process the first data from the node 10 and second data stored in the chip memory 22 and then writes computed data generated after the processing into the chip memory 22.

In this embodiment, step S6 and step S7 in the above-mentioned cross-node RDMA technique are combined into a single step B. In order to achieve step B, a universal problem needs to be solved because of a plurality of different operations that may be applied to the node 10 and the node 20. In this embodiment, the various operations described above are classified into a first operation and a second operation. Taking the artificial intelligence chip 21 of the node 20 as an example, the first operation of the artificial intelligence chip 21 is to receive data from the artificial intelligence chip 11 and write the data from the artificial intelligence chip 21 directly into the chip memory 22 without any operation on the data stored in the chip memory 22. In other words, the first operation may be, for example, an operation of directly writing data from an external node.

Taking the artificial intelligence chip 21 of the node 20 as an example again, the second operation of the artificial intelligence chip 21 is to receive the first data from the artificial intelligence chip 11 and process the first data from the artificial intelligence chip 21 as well as the second data stored in the chip memory 22. Based on the different data types of the first data and the second data, such as float (floating point number), half (half-precision floating point number) data types and the like, the above processing items may be one or more.

In this embodiment, the above operations may be distinguished in step B and may be dynamically supported at the same time. Therefore, in this embodiment, steps S6 and S7 in the above-mentioned cross-node RDMA technique may be supported, and processing of different data types may also be supported. In addition, in this embodiment, the above various operations may also be supported among multiple artificial intelligence chips in the same node.

Figure 3:
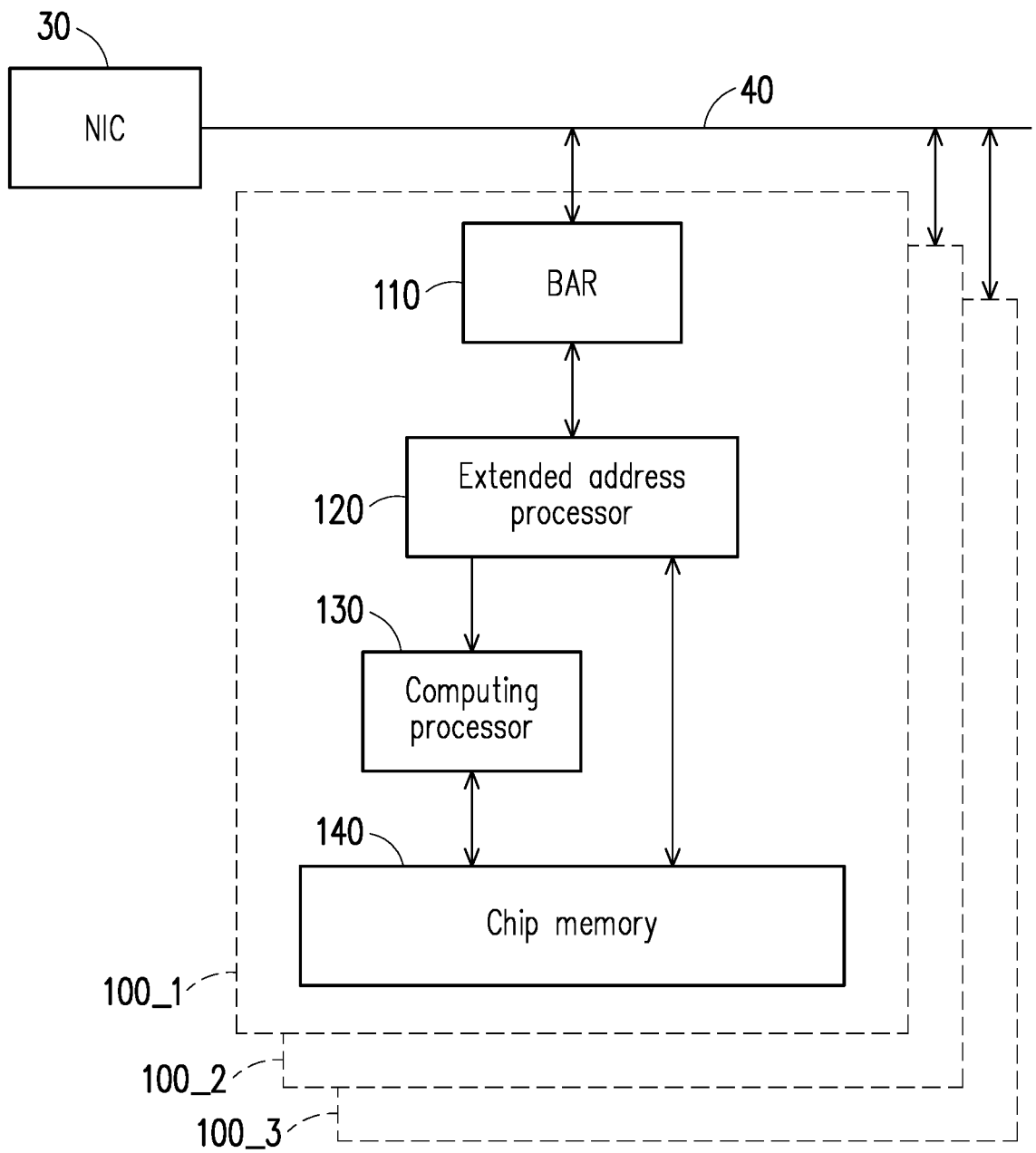
FIG. 3 is a circuit block schematic diagram of an artificial intelligence chip according to an embodiment of the disclosure.

To be specific, with reference to FIG. 3, FIG. 3 is a circuit block schematic diagram of an artificial intelligence chip according to an embodiment of the disclosure. The architecture of FIG. 3 is equivalent to at least a part of one of the node 1 and the node 2 of FIG. 1. In this embodiment, a single node includes artificial intelligence chips 100_1, 100_2, and 100_3. In the embodiment shown in FIG. 3, the artificial intelligence chips 100_1, 100_2, and 100_3 receive external data from the a NIC 30. The artificial intelligence chips 100_1, 100_2, and 100_3 may also perform communication. In addition, the artificial intelligence chip 100_1, 100_2, and 100_3 may also provide data to the NIC 30. For instance, the artificial intelligence chips 100_1, 100_2, and 100_3 may be connected to the NIC 30 through a bus 40. According to the actual design, the bus 40 may be a high-speed peripheral component interconnect express (PCIe) bus or other buses. The artificial intelligence chips 100_1, 100_2, and 100_3 may receive data from the NIC 30 through the bus 40. The artificial intelligence chips 100_1, 100_2, and 100_3 may also perform communication through the bus 40. Besides, the artificial intelligence chip 100_1, 100_2, and 100_3 may also provide data to the NIC 30 through the bus 40. The NIC 30 is equivalent to the NIC 26 (or the NIC 16) shown in FIG. 1. The artificial intelligence chips 100_1, 100_2, and 100_3 are equivalent to the artificial intelligence chip 21 (or the artificial intelligence chip 11) shown in FIG. 1.

In the disclosure, the number of artificial intelligence chips in a single node may be one or more, which is not limited to the number provided in this embodiment.

In this embodiment, taking the artificial intelligence chip 100_1 as an example, the artificial intelligence chip 100_1 is suitable for receiving a command carrying the first data and address information. The artificial intelligence chip 100_1 includes a base address register (BAR) 110, an extended address processor 120, a computing processor 130, and a chip memory 140. The computing processor 130 is coupled to the chip memory 140. The extended address processor 120 is coupled to the computing processor 130 and the base address register 110. In this embodiment, the extended address processor 120 and the computing processor 130 may be implemented in hardware (physical circuits). In other embodiments, a collective communication engine 220 may be implemented in firmware (or software).

Figure 4:
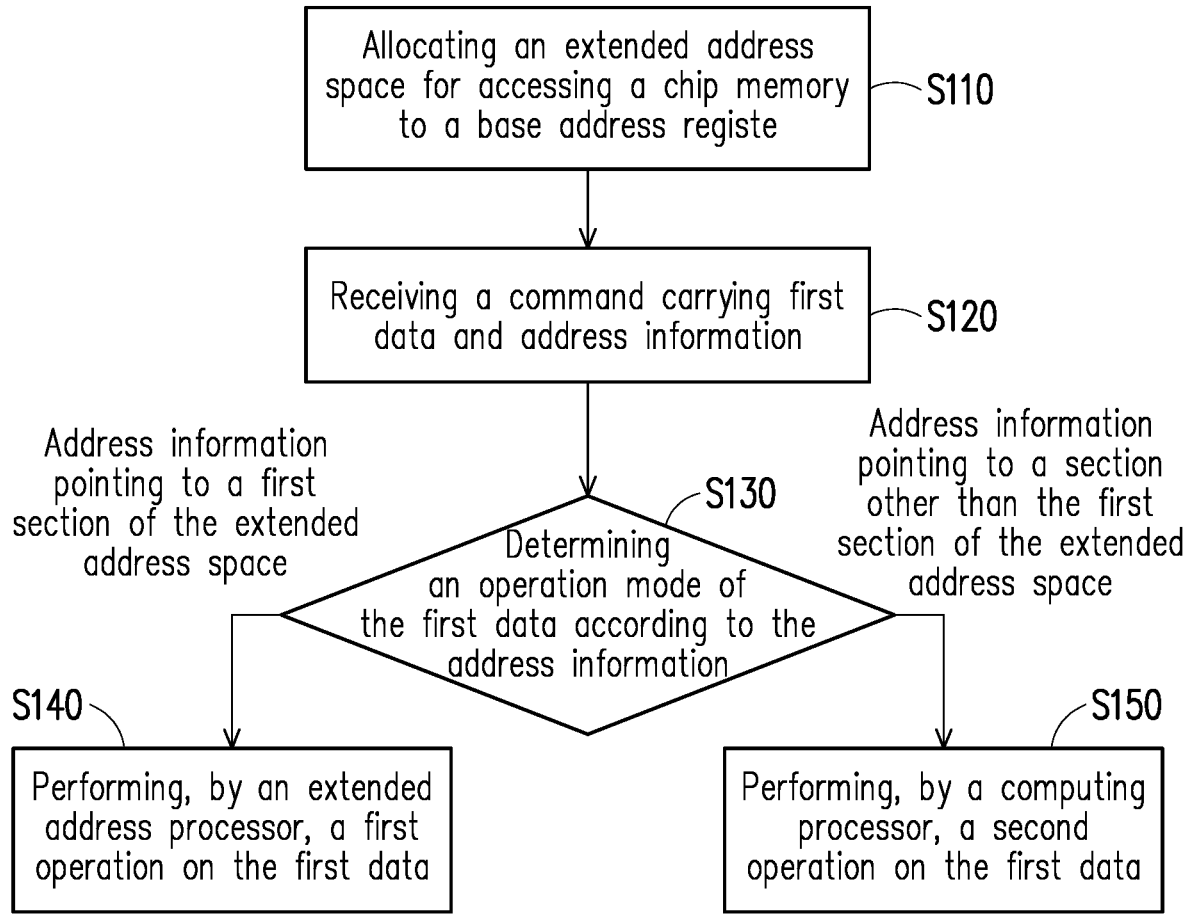
FIG. 4 is a schematic flow chart of a data operation method according to an embodiment of the disclosure.

With reference to FIG. 3 and FIG. 4 together, FIG. 4 is a schematic flow chart of a data operation method according to an embodiment of the disclosure. In step S110, the base address register 110 is configured to access an extended address space of the chip memory 140. In this embodiment, the extended address space is greater than a physical memory address space of the chip memory 140.

In this embodiment, it is assumed that the physical memory address space of the chip memory 140 of the artificial intelligence chip 100_1, a physical memory address space of a chip memory (not shown) of the artificial intelligence chip 100_2, and a physical memory address space of a chip memory (not shown) of the artificial intelligence chip 100_3 are all SZ. Therefore, definition of the physical memory address spaces of the chip memories is shown in Table 1.

TABLE 1

Definition of physical memory address space of chip memory

| Artificial intelligence chip | Starting address of chip memory | Ending address of chip memory |
|---|---|---|
| 100_1 | GPU1_BA | GPU1_BA + SZ − 1 |
| 100_2 | GPU2_BA | GPU2_BA + SZ − 1 |
| 100_3 | GPU3_BA | GPU3_BA + SZ − 1 |

As shown in Table 1, the starting address of the chip memory 140 is GPU1_BA. The ending address of the chip memory 140 is GPU1_BA+SZ−1. The starting address of the chip memory of the artificial intelligence chip 100_2 is GPU2_BA. The ending address of the chip memory of the artificial intelligence chip 100_2 is GPU2_BA+SZ−1. The starting address of the chip memory of the artificial intelligence chip 100_3 is GPU3_BA. The ending address of the chip memory of the artificial intelligence chip 100_3 is GPU3_BA+SZ−1.

The artificial intelligence chips 100_1, 100_2, and 100_3 occupy a system address space of SZ. In addition, the system address space ensures the exclusiveness of the address spaces. That is, there is no overlap in any two system address spaces. Therefore, when a processing unit other than the NIC or the artificial intelligence chips 100_1, 100_2, and 100_3 uses a given address for accessing, the command corresponding to the given address may be correctly sent to the chip memory corresponding to the given address.

Generally, a X86 central processing unit uses a 48-bit or 52-bit address bus. Taking the 48-bit address bus as an example, the central processing unit has 256 TB addresses. But the address space actually used by all hardware in the existing system is far less than 256 TB. A large number of addresses are not used.

When operations on N data types are required, the memory address space SZ of the base address register 110 is extended to an expanded address space greater than or equal to (N+1)×SZ, as shown in Table 2. N is an integer greater than or equal to 1. Therefore, in step S110, the base address register 110 is set to extend a first address space definition of the base address register 110 to a second address space definition. The first address space definition corresponds to physical memory address space of the chip memory. The second address space definition corresponds to the extended address space. The extended address space is an integer multiple, (e.g., N+1) of the physical memory address space. In this way, the unused address space in the original 256 TB may be used. Besides, the extended system address space also ensures the exclusiveness of the address spaces. That is, there is no overlap in any two extended system address spaces.

TABLE 2

Definition of extended address space of chip memory

| Artificial intelligence chip | Starting address of chip memory | Ending address of chip memory |
|---|---|---|
| 100_1 | GPU1_BA | GPU1_BA + (N + 1) × SZ − 1 |
| 100_2 | GPU2_BA | GPU2_BA + (N + 1) × SZ − 1 |
| 100_3 | GPU3_BA | GPU3_BA + (N + 1) × SZ − 1 |

Herein, N is associated with the data type of the collective communication operation that needs to be supported. If two data types of data reduction (REDUCE) operations are required to be supported, N is greater than or equal to 2. The two data types are, for example, float (first data type) and half (second data type). For instance, taking the REDUCE operation of float and half supported by N=3 as an example, the plan for the extended address space is shown in Table 3.

TABLE 3

Definition of extended address space

| Section | Extended address space | Corresponding operation |
|---|---|---|
| Section 1 | GPU_BA to GPU_BA + SZ − 1 | existing normal read and write operations |
| Section 2 | GPU_BA + SZ to GPU_BA + 2 × SZ − 1 | REDUCE operation of float |
| Section 3 | GPU_BA + 2 × SZ to GPU_BA + 3 × SZ − 1 | REDUCE operation of half |
| Section 4 | GPU_BA + 3 × SZ to GPU_BA + 4 × SZ − 1 | other operations |

In Table 3, the extended address space includes 4 sections. These 4 sections are section 1, section 2, section 3, and section 4. Section 1 to section 4 may be used to identify different operations. For instance, the extended address space of section 1 is GPU_BA to GPU_BA+SZ−1. Section 1 applies to the existing normal read and write operations. The extended address space of section 2 is GPU_BA+SZ to GPU_BA+2×SZ−1. Section 2 applies to the REDUCE operation of the first data type (e.g., float data type). The extended address space of section 3 is GPU_BA+2×SZ to GPU_BA+3×SZ−1. Section 3 applies to the REDUCE operation of the second data type (e.g., half data type). Further, the extended address space of section 4 is GPU_BA+2×SZ to GPU_BA+3×SZ−1. Section 4 is reserved for other operations, such as a REDUCE operation of other data types (e.g., INT32 data type) or an illegal operation on an undefined data type. Any one of section 1, section 2, section 3, and section 4 does not overlap with the remaining sections.

Therefore, through step S110, the extent of address space extension is determined by the number of types of operations that need to be operated, and extension may be performed while maintaining backward compatibility.

In step S120, the extended address processor 120 receives the command carrying the first data and the address information. In step S130, the extended address processor 120 may determines an operation mode of the first data according to the address information pointing to one among a plurality of sections (e.g., section 1 to section 4 in Table 3) of the extended address space.

Taking the data type REDUCE operation supported by Table 3 as an example, the specific behavior of the extended address processor 120 after parsing the address information is shown in Table 4 below.

TABLE 4

Specific behavior of extended address processor after parsing address information

| Extended address section | Operation type | Specific operation behavior |
|---|---|---|
| 0 to SZ − 1 (corresponding to section 1) | writing directly | directly accessing memory and writing to local chip memory without going through computing processor |
| SZ to 2 × SZ − 1 (corresponding to section 2) | performing REDUCE operation with local float type data | sending data to computing processor and writing data to local chip memory after REDUCE operation completed |
| 2 × SZ to 3 × SZ − 1 (corresponding to section 3) | performing REDUCE operation with local half type data | sending data to computing processor and writing data to local chip memory after REDUCE operation completed |
| 3 × SZ to 4 × SZ − 1 (corresponding to section 4) | undefined, current illegal operation | sending data to reserved section and/or to address exception handling module |

When the address information points to a first section (e.g., section 1) of the extended address space, the extended address processor 120 may perform the first operation on the first data in step S140. The first section corresponds to the physical memory address space. In this embodiment, the first operation includes, for example, directly storing the first data in the chip memory 140 without processing the first data by the computing processor 130, that is, a direct writing operation. When the address information points to a section other than the first section of the extended address space (i.e., one of sections 2 to 4), the computing processor 130 may perform the second operation on the first data in step S150. Further, in step S150, the extended address processor 120 may notify the computing processor 130 of the operation mode. Therefore, the computing processor 130 may learn the operation mode based on the notification from the extended address processor 120 and performs the second operation on the first data accordingly. In this embodiment, the second operation includes, for example, computing the first data to generate computed data and storing the computed data in the chip memory 140.

Taking Table 4 as an example, the second operation may be a REDUCE operation. Further taking the REDUCE operation as an example, the computing processor 130 may extract the second data from the chip memory according to the extended address in step S150 and computes the first data and the second data to generate the computed data. Next, the computing processor 130 stores the computed data in the chip memory 140 at one time.

In some embodiments, the operation type of the second operation is not limited to the REDUCE operation. In these operations, the operation type of the second operation may include at least one of a COMPARE operation, a REDUCE operation, and a non-collective communication operation. In these operations, the computing processor 130 may, for example, perform a COMPARE operation on the first data and the second data to obtain comparison results such as greater than, less than, and equal to, and records the comparison results in the local chip memory 140. For instance, the multiple sections of the extended address space may correspond to different operation types. Therefore, the extended address processor 120 may determine the operation type performed on the first data through the address information pointing to one among the sections of the extended address space.

For ease of description, the extended address space in this embodiment includes 4 sectors as an example. The number of sections in the disclosure may be multiple, and is not limited to the number provided in this embodiment.

For another example, in an embodiment, the number of sections may be (M+1). M different operation types are supported in this embodiment. Therefore, when the address information points to a $(M+1)^{th}$ section of the extended address space, the extended address processor 120 may determine that the operation type performed on the first data is a $M^{th}$ operation type, where M is an integer greater than or equal to 1. Incidentally, the artificial intelligence chip 100_1 receives the command carrying the first data and the address information and determines the collective communication operation of the first data according to the extended address pointing to one among the sections of the extended address space. Therefore, the artificial intelligence chip 100_1 may efficiently perform the collective communication operation. Further, the collective communication operation based on address extension provided in this embodiment may greatly improve the cross-node operation performance in a large-scale clustering scenario, including support for REDUCE operations of different data types. For applications such as artificial intelligence training, a large number of REDUCE operations are executed, and in addition, full REDUCE operations across nodes may be executed. Based on the above operations of this embodiment, performance of the REDUCE operations and cross-node full REDUCE operations may be effectively improved, and the overall system computing performance may thus be enhanced.

The extended address processor 120 further determines the data type corresponding to the first data through the extended address pointing to one among the sections of the extended address space. When the extended address points to the second section (section 2) of the extended address space, the first data may be determined as the first data type (e.g., float data type). Therefore, the first data and the second data of the float data type are sent to the computing processor 130. The computing processor 130 performs the REDUCE operation on the first data and the second data of the float data type to generate computed data. Next, the computing processor 130 writes the computed data to the local chip memory 140 at one time.

When the extended address points to the third section (section 3) of the extended address space, the first data may be determined as the second data type (e.g., half data type). Therefore, the first data and the second data of the half data type are sent to the computing processor 130. The computing processor 130 performs the REDUCE operation on the first data and the second data of the half data type to generate computed data. Next, the computing processor 130 writes the computed data to the local chip memory 140 at one time. In an embodiment, the number of sections may be (N+1). Therefore, N different data types may be supported in this embodiment. Therefore, when the address information points to a $(N+1)^{th}$ section of the extended address space, the extended address processor 120 may determine that the first data is a $N^{th}$ data type, where N is an integer greater than or equal to 1.

In the disclosure, the sections other than the first section of the extended address space may be defined as different data types, defined as different operation types, or defined as different data types and different operation types. For instance, the second section is determined to be the first data type and the first operation is performed, and the third section is determined to be the second data type and multiple combinations such as the second operation are executed.

For another instance, for N data types and M operation types, plus the operation of the first section, a total of (1+N×M) possible combinations may be supported in the disclosure.

Figure 5:
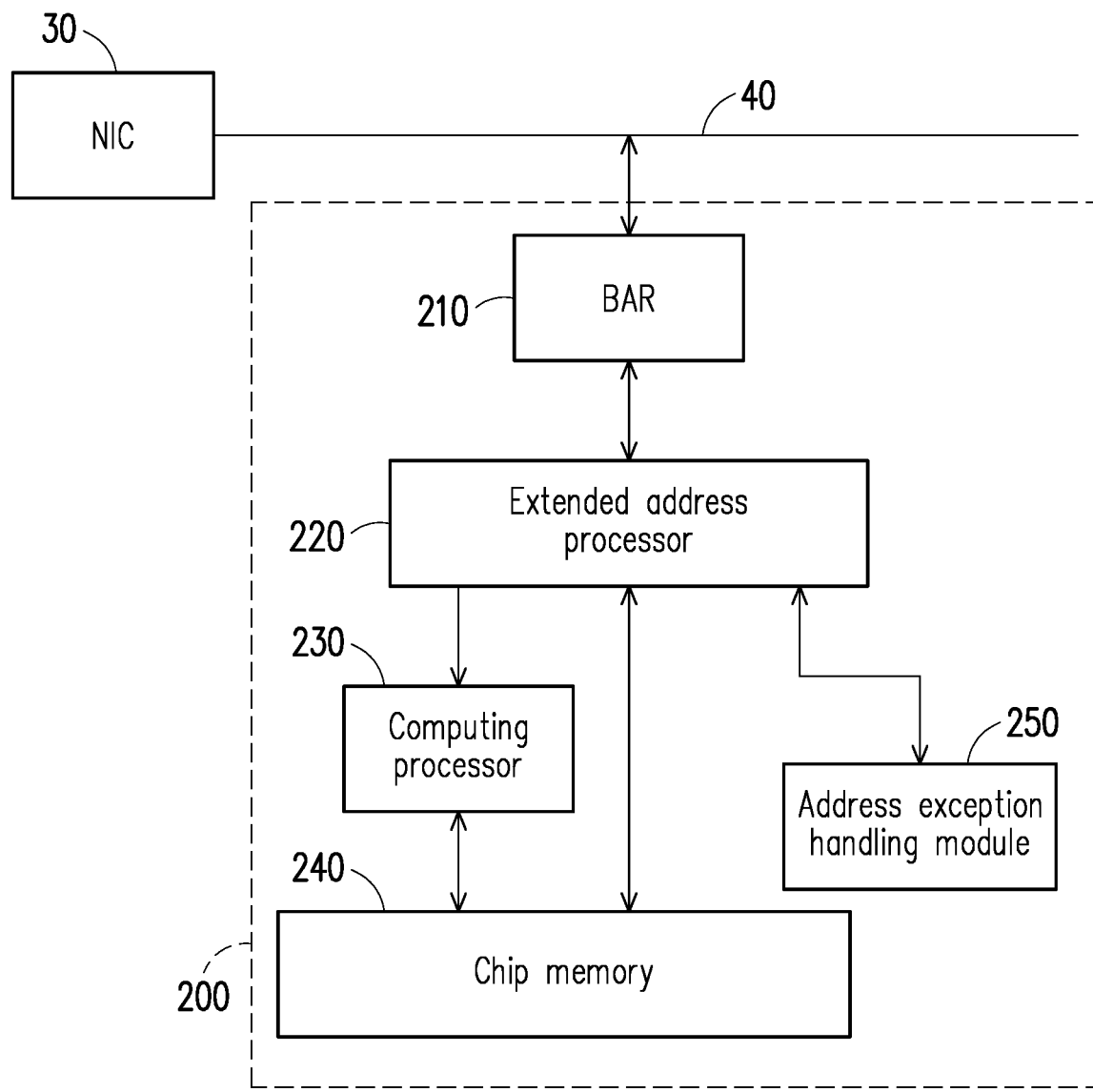
FIG. 5 is a circuit block schematic diagram of an artificial intelligence chip according to another embodiment of the disclosure.

In addition, when the extended address points to the fourth section (section 4) of the extended address space, the first data may be determined as the undefined data type. The undefined data type is an unrecognizable data type or an unacceptable data type. Therefore, the first data of the undefined data type may be sent to the reserved section. With reference to FIG. 5 and Table 4 together, FIG. 5 is a circuit block schematic diagram of an artificial intelligence chip according to another embodiment of the disclosure. In this embodiment, an artificial intelligence chip 200 includes a base address register 210, an extended address processor 220, a computing processor 230, a chip memory 240, and an address exception handling module 250. The address exception handling module 250 is coupled to the extended address processor 220. In this embodiment, when the extended address points to the fourth section (section 4) of the extended address space, the first data may be determined as the undefined data type and is sent to the address exception handling module 250. The address exception handling module 250 may perform the illegal operation on the first data. In this embodiment, sufficient teachings on collaborative operations among the base address register 210, the extended address processor 220, the computing processor 230, and the chip memory 240 may be obtained in the embodiments of FIG. 3 and FIG. 4, and description thereof is thus not repeated herein.

In view of the foregoing, the artificial intelligence chip receives the command carrying the first data and the address information and determines the collective communication operation of the first data according to the extended address pointing to one among the sections of the extended address space. In this way, the artificial intelligence chip may efficiently perform the collective communication operation. For applications such as artificial intelligence training, a large number of REDUCE operations are executed, and in addition, full REDUCE operations across nodes may be executed. Based on the above operations of the embodiments, performance of the REDUCE operations and cross-node full REDUCE operations may be effectively improved, and the system computing performance may thereby be enhanced.

Finally, it is worth noting that the foregoing embodiments are merely described to illustrate the technical means of the disclosure and should not be construed as limitations of the disclosure. Even though the foregoing embodiments are referenced to provide detailed description of the disclosure, people having ordinary skill in the art should understand that various modifications and variations can be made to the technical means in the disclosed embodiments, or equivalent replacements may be made for part or all of the technical features; nevertheless, it is intended that the modifications, variations, and replacements shall not make the nature of the technical means to depart from the scope of the technical means of the embodiments of the disclosure.

What is claimed is:

1. A data operation method for an artificial intelligence chip, wherein the artificial intelligence chip comprises a chip memory, a base address register, an extended address processor, and a computing processor, wherein the data operation method comprises:
   allocating an extended address space for accessing the chip memory to the base address register, wherein the extended address space is greater than a physical memory address space of the chip memory;
   receiving, by the extended address processor, a command carrying first data and address information;
   determining, by the extended address processor, an operation mode of the first data according to the address information pointing to one among a plurality of sections comprised in the extended address space;
   performing, by the extended address processor, a first operation on the first data when the address information points to a first section of the extended address space; and
   notifying, by the extended address processor, the computing processor of the operation mode, performing, by the computing processor, a second operation on the first data when the address information points to a section other than the first section of the extended address space,
   wherein the first section corresponds to the physical memory address space.

2. The data operation method according to claim 1, wherein
   the first operation comprises directly storing the first data in the chip memory without processing the first data by the computing processor, and
   the second operation comprises computing the first data to generate computed data and storing the computed data in the chip memory.

3. The data operation method according to claim 1, wherein the data operation method further comprises:
   determining, by the extended address processor, a data type corresponding to the first data through the address information pointing to one among the sections of the extended address space; and
   determining the first data to be a $N^{th}$ data type when the address information points to a $(N+1)^{th}$ section of the extended address space,
   wherein N is an integer greater than or equal to 1.

4. The data operation method according to claim 1, wherein the extended address space is an integer multiple of the physical memory address space.

5. The data operation method according to claim 1, wherein the data operation method further comprises:
   allowing the artificial intelligence chip to communicating with other artificial intelligence chips via a peripheral component interconnect express (PCIe) interface.

6. The data operation method according to claim 1, wherein the extended address processor determines an operation type performed on the first data through the address information pointing to one among the sections of the extended address space,
   wherein the operation type performed on the first data is determined to be a $M^{th}$ operation type when the address information points to a $(M+1)^{th}$ section of the extended address space,
   wherein M is an integer greater than or equal to 1.

7. The data operation method according to claim 1, wherein the data operation method further comprises:
   extracting, by the computing processor, second data from the chip memory according to the address information;
   computing the first data and the second data to generate computed data; and
   storing the computed data in the chip memory.

8. An artificial intelligence chip, suitable for receiving a command carrying first data and address information, the artificial intelligence chip comprising:
   a chip memory;
   a computing processor, coupled to the chip memory;
   a base address register, configured to access an extended address space of the chip memory, wherein the extended address space is greater than a physical memory address space of the chip memory; and
   an extended address processor, coupled to the computing processor and the base address register, configured to receive the command, wherein the extended address processor determines an operation mode of the first data according to the address information pointing to one among a plurality of sections comprised in the extended address space,
   wherein the extended address processor performs a first operation on the first data when the address information points to a first section of the extended address space,
   wherein the extended address processor notifies the computing processor of the operation mode and the computing processor performs a second operation on the first data when the address information points to a section other than the first section of the extended address space, wherein the first section corresponds to the physical memory address space.

9. The artificial intelligence chip according to claim 8, wherein
the first operation comprises directly storing the first data in the chip memory without processing the first data by the computing processor, and
the second operation comprises computing the first data to generate computed data and storing the computed data in the chip memory.

10. The artificial intelligence chip according to claim 8, wherein the extended address processor determines a data type corresponding to the first data through the address information pointing to one among the sections of the extended address space,
wherein the first data is determined to be a $N^{th}$ data type when the address information points to a $(N+1)^{th}$ section of the extended address space,
wherein N is an integer greater than or equal to 1.

11. The artificial intelligence chip according to claim 8, wherein the extended address space is an integer multiple of the physical memory address space.

12. The artificial intelligence chip according to claim 8, wherein the artificial intelligence chip communicates with other artificial intelligence chips via a peripheral component interconnect express (PCIe) interface.

13. The artificial intelligence chip according to claim 1, wherein the extended address processor determines an operation type performed on the first data through the address information pointing to one among the sections of the extended address space,
wherein the operation type performed on the first data is determined to be a $M^{th}$ operation type when the address information points to a $(M+1)^{th}$ section of the extended address space,
wherein M is an integer greater than or equal to 1.

14. The artificial intelligence chip according to claim 8, wherein the computing processor is further configured to extract second data from the chip memory according to the address information, and the computing processor computes the first data and the second data to generate computed data and stores the computed data in the chip memory.

* * * * *